United States Patent [19]
Frank et al.

[11] 3,942,608
[45] Mar. 9, 1976

[54] CASTER BRAKE ASSEMBLY

[75] Inventors: Edward J. Frank; John M. Freeman, both of Evansville, Ind.

[73] Assignee: Bliss & Laughlin Industries Incorporated, Oak Brook, Ill.

[22] Filed: Nov. 8, 1974

[21] Appl. No.: 522,059

[52] U.S. Cl. ................................. 188/1 D; 188/74
[51] Int. Cl.² ........................................ B60T 1/04
[58] Field of Search ......... 16/35 D; 188/1 D, 19–22, 188/74, 29

[56] References Cited
UNITED STATES PATENTS

| | | | |
|---|---|---|---|
| 2,147,064 | 2/1939 | Schultz | 188/1 D UX |
| 2,709,828 | 6/1955 | Noelting et al. | 188/1 D UX |
| 2,905,275 | 9/1959 | Kostolecki et al. | 188/74 |

*Primary Examiner*—Duane A. Reger
*Attorney, Agent, or Firm*—Woodard, Weikart, Emhardt & Naughton

[57] ABSTRACT

A caster assembly has a brake shoe member including a wheel tread contacting shoe, and a foot operable brake applying and release lever, the shoe member being guided horizontally, both longitudinally and laterally adjacent the wheel contacting shoe for positive shoe action in response to operation of the lever.

6 Claims, 4 Drawing Figures

U.S. Patent   March 9, 1976   3,942,608
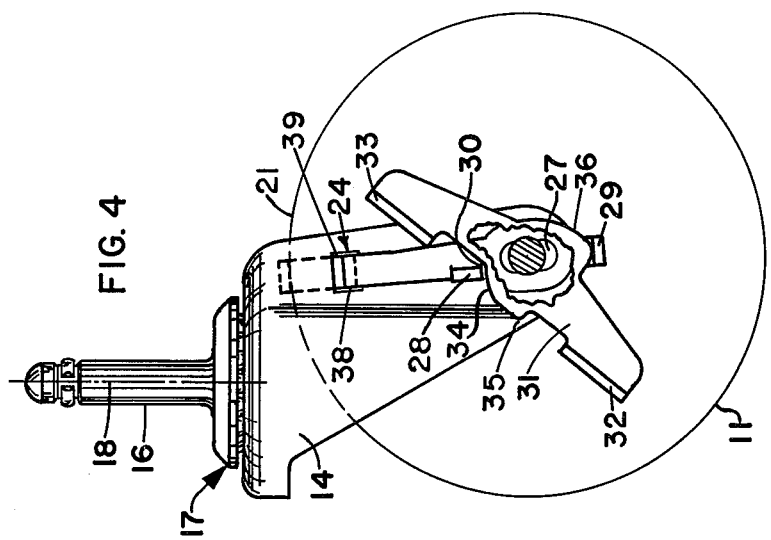
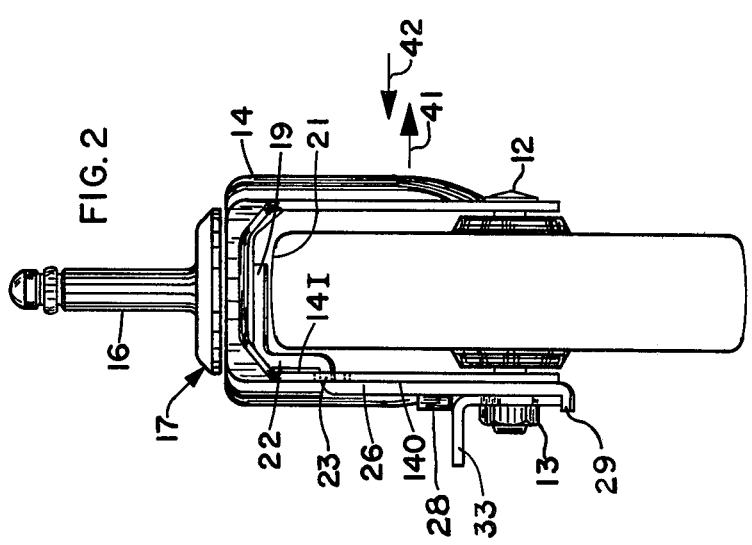
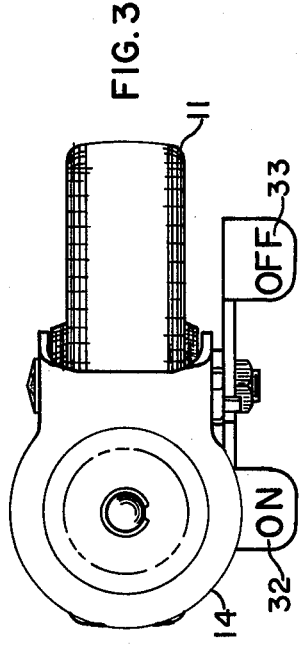
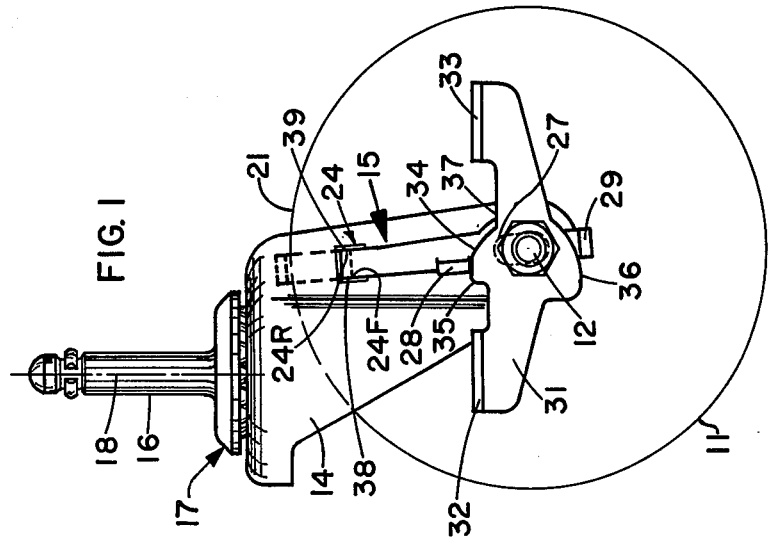

CASTER BRAKE ASSEMBLY

BACKGROUND OF THE INVENTION

1. Field of the Invention

This invention relates generally to caster assemblies, and more particularly to caster assemblies including foot-operated brake means thereon, to prevent rolling of the wheel when it is desired that the object supported by the casters remain in place.

2. Description of the Prior Art

Many casters are known in the prior art having various means for locking the wheel. These include U.S. Pat. No. 3,467,981 to Peter, which includes treadle-operated, cam-driven balls operating plungers to force the caster wheel against the horn to brake the wheel by friction. Patents incorporating a front-mounted, lvever-operated wheel tread engaging brake include: U.S. Pat Nos. 2,572,548 to Weisz et al, 2,707,794 to Kramcsak, Jr., 2,709,828 to Noelting et al., and 2,915,775 to Skupas. The patent to Forbes, U.S. Pat. No. 2,494,696 discloses a rear-mounted brake, and the U.S. Pat. Nos. 2,484,094 to Jackson, 2,900,659 to Snell, and 2,972,163 to Ross disclose rear-mounted cam-and-lever operated brakes. The recently issued Bolger U.S. Pat. No. 3,828,392 discloses a rear-mounted, cam-and-lever operated brake.

We have found that further improvement is needed in such brakes, to promote uniformity and consistency of movement of the shoe in response to action of the brake applying and release lever, and to promote positive action.

SUMMARY

Described briefly, in a typical embodiment of the present invention, a brake shoe member has a wheel contactor shoe extending parallel to the rotational axis of the wheel and disposed radially outwardly from the wheel. The member is movable toward the axis to bring the shoe into contact with the wheel, to brake the wheel. The member includes a locator having a horizontally extending offset which extends through a hole in the wall of the horn, with the locator portions immediately above and below the hole being disposed immediately adjacent the horn for lateral guidance. The front and rear edges of the locator are guided by front and rear edges of the hole in the horn for control of the brake shoe member near the location of contact of the shoe thereof with the tread of the wheel.

BRIEF DESCRIPTION OF THE DRAWINGS

FIG. 1 is a side elevational view of our improved caster brake assembly, with the brake "off".

FIG. 2 is a rear elevational view thereof.

FIG. 3 is a top plan view thereof.

FIG. 4 is a fragmentary side elevational view with the brake "on".

DESCRIPTION OF THE PREFERRED EMBODIMENT

The illustrated caster assembly includes a wheel 11, axle bolt 12, and nut 13, mounted to the horn 14. A pin 16 and ball bearing swivel assembly 17 mounted thereto and to the horn provide for swiveling about the axis 18.

A brake shoe member 15 includes a brake shoe 19 disposed immediately above the tread 21 of the wheel. Shoe 19 extends in a cantilever manner from an upper inside guiding locator portion 22 of the brake shoe member 15, which projects upwardly from a horizontally extending offset 23 which extends through a hole or upper guide slot 24 in the caster horn. Immediately below the guide slot and outboard of the caster horn is the outer guiding locator portion 26 of the brake shoe member and this extends downwardly and has a slot 27 in the lower portion thereof receiving the axle bolt 12 therethrough. The brake shoe member has outwardly projecting release cam follower 28 thereon and outwardly extending apply cam follower 29.

A brake operating lever 31 has a brake applying foot pad 32 and a brake releasing foot pad 33 thereon, these both projecting outwardly from the horn in horizontal planes and having a configuration best shown in FIG. 3. The brake operating lever has a brake release cam 34 and a brake applying cam 36 thereon. The release cam is shown in FIGS. 1 to 3 at the limit of its brake releasing travel where it has forced upwardly the release cam follower 28 to move the brake shoe member upwardly in the upper guide slot 24 to release the brake shoe from the tread of the wheel. Thus the wheel is free to rotate. The bottom of slot 27 engaging the underside of the axle can serve to limit upward travel of member 15.

When the brake apply pad 32 is pushed downwardly with the foot to the position shown in FIG. 4, the apply cam 36 engages the upper face of the horizontally projecting apply cam follower 29 and forces the brake shoe member downward to engage the brake shoe with the tread of the wheel, as shown in FIG. 4. The limit on the counterclockwise pivotal motion of the brake operating lever about the axis of the axle bolt is provided by the portion 37 of the brake operating lever engaging the rear face of the release cam follower 28 at 30, as shown in FIG. 4. The limit on clockwise travel as shown in FIG. 1 occurs when the flat 35 at the end of cam 34 encounters the follower 28 which can move no farther upward due to slot 27 stopping on the axle 12.

The front and rear edges 38 and 39 of the brake shoe member offset 23 are immediately adjacent and in abutting engagement with the front and rear edges 24F and 24R, respectively, of the guide slot 24 in the horn, and therby strictly confine the brake shoe member in the longitudinal sense. Furthermore, as shown in FIG. 2, the outer guiding locator portion of the brake shoe member is flush with the outer face of the horn at 140 to limit movement of the brake shoe member inwardly in the direction of arrow 41. Similarly, the upper locator portion 22 of the brake shoe member is flush with the inside wall 14I of the horn to prevent movement of the brake shoe outwardly laterally in the direction of arrow 42. In this way there is positive guidance both longitudinally and laterally for the brake shoe member adjacent the shoe as it is moved up and down in response to operation of the operating lever 31, and as braking loads are applied to the shoe. The upper face of offset 23 can be used to abut with the upper edge of slot 24, if desired, instead of or in addition to abutment of axle 12 by slot 27, to limit upward travel of the brake shoe member, during release.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

We claim:

1. In a caster assembly having a wheel, a horn, mounted to said wheel, and means mounted to said horn for pivotal attachment to an item to be supported by the caster assembly, the improvement comprising:

a brake shoe member having a wheel contactor shoe extending parallel to the rotational axis of the wheel and disposed radially outward from the wheel and movable inwardly to a position of engagement with the tread of the wheel to prevent wheel rotation;

said brake shoe member having a locator guidingly received on the horn and locating said shoe laterally with respect to the horn and locating said shoe at the correct index position with respect to the horn about a rotational axis of the wheel, said locator having an offset extending through a hole in a wall of said horn, said locator being slidingly engageable with said wall above and below said hole on the inside and outside of said wall respectively, to provide the lateral location of said shoe, and the front and rear edges of the hole providing guiding engagement with front and rear edges of the offset to maintain the correct index position of the shoe with respect to the horn, said wall of said horn being between said wheel and the portion of the locator below said hole whereby said wheel is centered between said wall and an opposite wall of said horn;

and shoe operating means associated with said horn and operable to alternately move said shoe to and from said engagement position.

2. The improvement of claim 1 and further comprising:

a shoe applying cam follower on said brake shoe member, and a shoe release cam follower on said brake shoe member, said shoe operating means including a shoe operating lever pivotally mounted on said horn and having shoe applying cam means thereon and shoe release cam means thereon, said lever being pivotable in an "on" direction to drive said shoe applying cam means against said applying cam follower to engage the shoe with the wheel tread, and said lever being pivotable in an "off" direction to drive the release cam means against said release cam follower to drive the shoe away from the tread of the wheel.

3. The improvement of claim 2 wherein:

said brake shoe member has stop means thereon to limit travel of the shoe away from the tread of the wheel.

4. The improvement of claim 3 wherein:

said stop means is a horizontally extending portion of the offset engageable with a horizontally extending upper margin of the hole in the horn to limit the travel, said upper margin of the hole being nearer to the axis of the wheel than is the tread of the wheel, whereby the inside of the first mentioned wall of the horn above the hole laterally supports the shoe locator and thereby the shoe inside the horn above the hole to provide adequate braking force to the shoe when the shoe is engaged with the wheel tread as the brake is applied.

5. The improvement of claim 2 wherein:

said lever has a stop portion thereon abuttingly engageable with said release cam follower to limit pivoting of the lever in the "on" direction.

6. The improvement of claim 2 and further comprising:

foot engageable brake shoe applying and release pads on said lever ahead of and behind the rotational axis of said wheel, said shoe applying pad being downwardly depressable by foot action thereon to pivot said lever in an "on" direction, said release pad being downwardly depressable by foot action thereon to pivot said lever in the "off" direction.

* * * * *